United States Patent
Geise

[11] Patent Number: 5,518,346
[45] Date of Patent: May 21, 1996

[54] HIGH-SPEED HYDRODYNAMIC SPINDLE AND METHOD FOR MACHINING COMPOSITE AND SPECIALIZED METALLIC MATERIALS

[76] Inventor: Samuel C. Geise, 6620-B Willow Pointe Dr., Huntsville, Ala. 35806

[21] Appl. No.: 278,118

[22] Filed: Jul. 21, 1994

[51] Int. Cl.$^6$ .................................................. B23C 1/00
[52] U.S. Cl. .................. 409/132; 408/1 R; 408/124; 409/193; 409/231
[58] Field of Search ...................... 409/132, 141, 409/231, 232, 186, 193; 408/1 R, 9, 124, 238

[56] References Cited

U.S. PATENT DOCUMENTS

| | | | |
|---|---|---|---|
| 3,058,559 | 10/1962 | Ohinberger | 409/141 |
| 3,703,846 | 11/1972 | Krafft | 409/232 |
| 4,784,540 | 11/1988 | Underbaug | 409/138 |
| 4,819,526 | 4/1989 | Seise | 408/80 |

*Primary Examiner*—Daniel W. Howell
*Attorney, Agent, or Firm*—Mark Clodfelter

[57] ABSTRACT

A method for machining is disclosed wherein cutting edges of a cutting tool are oriented at a negative rake of from approximately 0 degrees to −10 degrees. The tool is rotated at a speed of between approximately 15,000 rpm to approximately 30,000 rpm, after which the cutting edges are engaged with a workpiece. Thereafter, power applied to the cutting tool is varied so as to maintain constant rotational speed of the cutting tool while the cutting edges are engaged with the workpiece. During the machining process, vibrations are absorbed by a hydraulic cushion, allowing the tool to rotate without vibration, with heat generated by the machining process being confined mainly to the removed material.

20 Claims, 5 Drawing Sheets

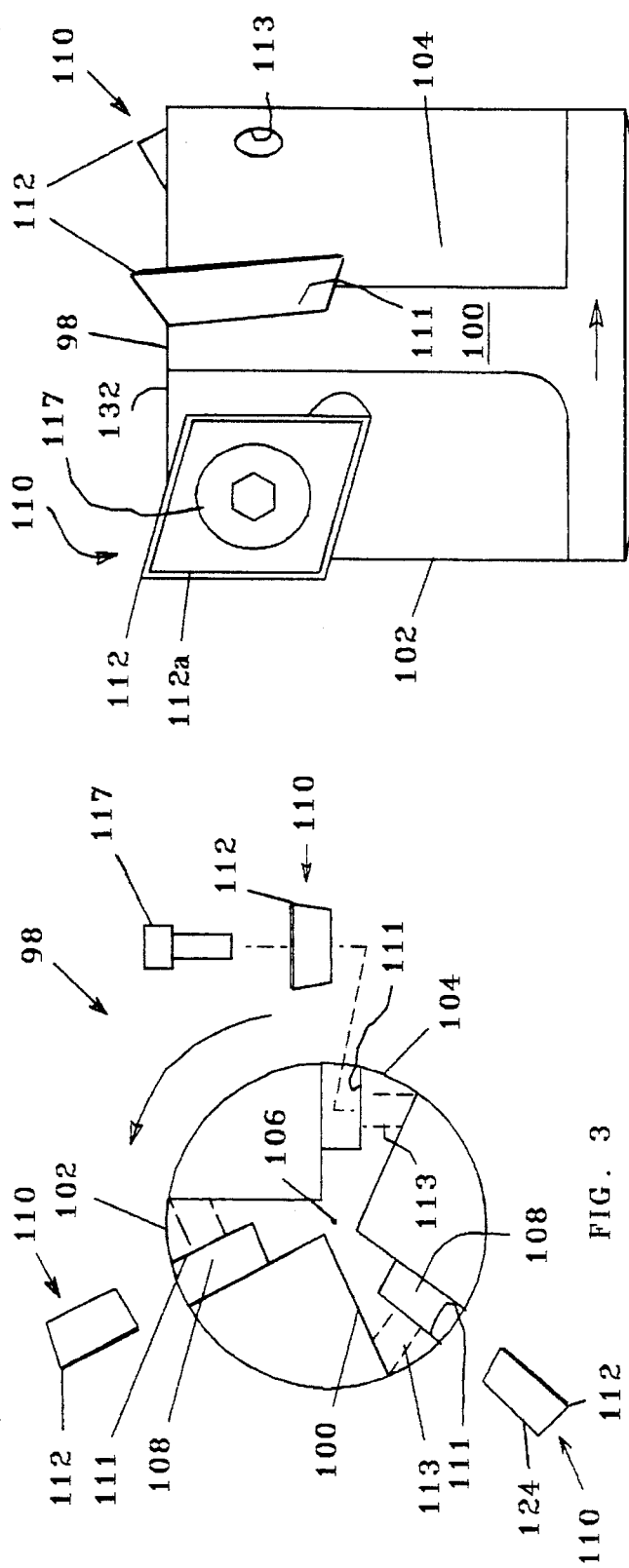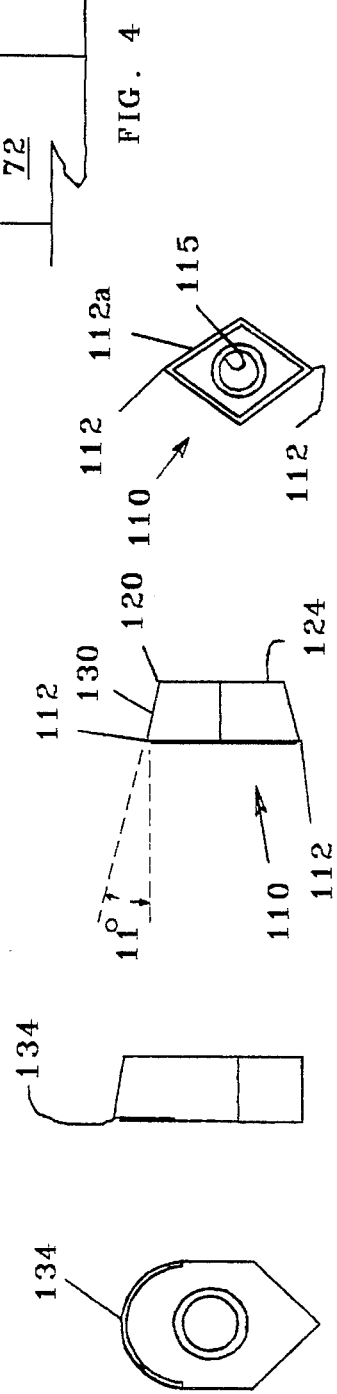

HIGH-SPEED HYDRODYNAMIC SPINDLE AND METHOD FOR MACHINING COMPOSITE AND SPECIALIZED METALLIC MATERIALS

This invention was made with government support under proposed SMALL BUSINESS INCENTIVE contract No. 92-1 04.12 1604. The government has certain rights in the invention.

FIELD OF THE INVENTION

This invention relates generally to apparatus and methods for machining of composite and hardened metal materials, and particularly to a system including a hydraulic motor and spindle assembly, and a method for using same in conjunction with computer numerical control machine tools, robotic manipulators, and the like.

BACKGROUND OF THE INVENTION

Many recently developed composite materials, which typically consist of bonded layers of dissimilar materials, such as graphite composites including graphite/bismaleimide, graphite/phenolitic, graphite/polyamide, and other composites, have properties that cause them to be difficult to machine by conventional methods. In part, these difficulties arise due to relatively slow cutting speeds of cutting tools, which generate heat that in turn causes separation (delamination) of the various layers of materials. Also, as the design of conventional cutting tools depends on relatively high instantaneous pressures to advance cutting edges of the tool into the composite, chipping of the composite frequently results. Further, many of these composites possess highly abrasive characteristics and tend to wear cutting edges of conventional cutting tool bits at inordinately high rates.

One attempt to circumvent these problems has involved the use of chemical etching wherein regions of a composite component that are to be unaffected by the etching process are coated with a "resist" material, with areas to be removed being exposed to a corrosive agent.

Problems with the etching process are that it is time-consuming and difficult, if not impossible, to precisely control removal of material from the component, making the process unsuitable for precision work. Additionally, there exists a risk of contamination to the environment and hazards to workers due to toxicity and corrosiveness of the materials used in the etching process.

Manually operated cutting tools, such as die grinders, hand-held drills, and the like have also been tried and have been found to be unsatisfactory because they are labor intensive and not productive of precise tolerances required by aeronautical and aerospace applications. Additionally, as one cannot hold or move a motor driven, hand-held tool as precisely as a machine, the life of tool bits constructed of hard, brittle materials, such as carbide, is greatly reduced.

In addition to these problems related to machining of composite materials, advanced hardened metallic alloys such as Inconel, Waspaloy, NASA-23, 18-8 stainless steel, alloys of aluminum and lithium, 22-19 aluminum, Incaloy 903, titanium alloys, and other recently developed metallic alloys, present a wide range of problems when they are attempted to be machined. Here, characteristics of these materials that make them particularly applicable to aeronautical and aerospace applications, which include low mass, high melting temperature, hardness and toughness, etc, frequently results in the workpiece being chipped or otherwise roughened by spalling, galling, heat working, and other deleterious processes caused by relatively low speed of the tool bits during the machining process. Because of these deleterious processes, further grinding and polishing is required to finish the machined article. Additionally, as each cutting edge of a machine tool can only remove a tiny amount of the hardened material, typically only 0.001 to 0.002 inch per pass, these machining processes are time-consuming because of slow feed rates and expensive due to breakage and wear of tool bits, some of which may cost hundreds or thousands of dollars.

In these conventional machining processes, as far as is known by the applicant, an electric motor powers a spindle to which in turn is mounted cutting tools or bits used in the machining process. Where the motor is powered by alternating current, only limited speed control of the motor is possible, generally due to multiple, selectively powered sets of windings in the motor, with motor speed dependent on the particular winding that is energized.

In the instance of direct current motors, which are typically servo motors, rotational speed of the motor is controlled up to approximately 3,600 rpm by varying voltage applied to the motor. However, where an electrical motor is coupled to a spindle, sonic and harmonic vibrations from the motor, in addition to the incremental power surges that occur during operation as each respective winding of the motor is energized, are transmitted to the tool bit. It is believed that these surges and vibrations contribute to "dwell," a phenomena characterized by cutting surfaces of the cutting tool or bit momentarily hanging or digging into the surface of the workpiece being cut, which may result in dangerous explosive destruction of the fragile, brittle cutting tool or bits, and which certainly causes excess wear thereto. Additionally, the power surges and harmonic and sonic vibrations cause "chatter," which in turn causes chipping and high wear of the tool bits. Further, servo motors require control circuitry, making them expensive, some of which approach approximately $80,000 in cost. Also, these bulky, heavy electrical motors do not lend themselves to be mounted to robotic manipulators or movable components of computer numeric control (CNC) machine tools, which are capable of supporting and moving only limited weight.

In addition to problems related to the described power surges and harmonic and sonic vibrations associated with electrically powered spindles, conventional cutting bits are typically mounted at positive angles (the cutting edge angled toward the direction of rotation) with respect to the workpiece so as to dig or shave material therefrom. This generates forces which tend to pull the cutting bits into the workpiece, which, in conjunction with any side or axial play or looseness in the spindle, contributes to the problems of dwell and chatter. As such, cutting bits are constructed having small cutting surfaces and are generally configured to limit the amount of material that is removed by a cutting bit in a single pass or rotation. As a result, pressure and relatively low speed of the cutting tool is often required to advance the cutting bits into the workpiece, causing friction that generates large amounts of heat in the surface of the workpiece being cut, the resultant shavings, and the cutting bits. This heat, which otherwise would destroy the temper in treated alloys and the cutting bits, or cause warpage of the workpiece, is conventionally carried away by a coolant applied directly to the cutting or machining operation. As such, some machine tools must be equipped with provisions for pumping, applying, filtering and recycling such coolants, adding to their costs and to costs of the machining operation, as these coolants must be periodically replaced.

In some instances, such as tool post grinders, an electrical motor is coupled to a spindle via a belt drive and, through a step-up pulley system, is capable of driving the spindle at speeds of up to approximately 12,000 rpm. In this instance, some of the harmonic and sonic vibrations from the electrical motor are isolated by separation of the rotational member of the motor from the rotating spindle by the drive belt. However, since the motor is typically fixed to the same mounting member as the spindle, some motor vibrations are transmitted to the spindle, resulting in excess wear of the tool and less than optimum machine work as described. Further, with a belt drive, there is greater possibility of encountering dwell due to flexure of the belt during operation, which causes an elastic snapping or whipping motion of the spindle and tool head. Further yet, these motors and spindles are expensive due to precision construction and are relatively expensive to operate due to the necessity of frequent belt replacement.

The applicant has developed a portable, hand-held apparatus for cutting ends of boiler tubes at relatively precise angles. In this reference, which is applicant's U.S. Pat. No. 4,819,526, a portable pushcart supports a motor coupled to a hydraulic pump and reservoir of hydraulic fluid, the pump providing a source of hydraulic fluid under pressure. A high-pressure line and return line are coupled from the pump to a hand-held tool which includes as a drive element a hydraulic motor, which develops about 45 inch-pounds of torque and has an output shaft capable of being driven at speeds from approximately 3,000 rpm to approximately 12,000 RPM, depending on the particular hydraulic motor used. A cutting tool mounted to the motor is disclosed as having a pilot shaft for centering the tool in a boiler tube, which tool also is provided with conventional carbide cutters for cutting edges of the tube. The cutters are each angled with a negative back rake and are provided with means for limiting the cut of each cutter to a maximum cut of 0.002 inch of the boiler tube end per pass. Also disclosed in this reference is the advantage that, since the tool is a hand-held tool, the hydraulic motor will absorb impact forces and shock when the cutting means engages a tube, reducing the probability that the cutting edges of the carbide cutters will be chipped or broken as a worker manually engages the tool with the end of a boiler tube.

While this apparatus works well for cutting relatively precise angles on boiler tube ends, it is not adaptable for any other operation, such as surface cutting (milling), involving precise, high-speed machining operations of composite or esoteric alloyed metals such as those found in aeronautical and aerospace applications due to the fact that it is a portable, hand-held tool rotating from approximately 3,000 to 12,000 rpm and is constructed only for cutting the end of a tube at a selected angle. Further, since the maximum cut of each cutter is limited to 0.002 inch, feed rates of material to this tool would correspondingly be limited to about 72 inches per minute at the maximum disclosed rotational speeds of 12,000 rpm of the cutting tool. Additionally, there is no suggestion in the reference that the apparatus may be subjected to relatively high side (radial) loads, such as are required when high feed rates on the order of 200 to 600 inches per minute of material are encountered during surface cutting operations, the prior art device only being intended to receive axial loads as it is held by hand against the end of a boiler tube. Additionally, there is no provision for varying rotational speed of the motor and cutter or for holding rotational speed of the cutter constant.

Further yet, as the entire unit is portable and highly mobile, being mounted on a pushcart, the drive motor provides only enough power to cut boiler tube ends, which is not sufficient power for the high-speed machining operations contemplated by the instant invention.

Lastly, the pilot shaft of the hand-held tool, as described in the reference, could bind and cause the tool to abruptly cease rotation while engaged with a boiler tube, transferring the motor torque to hands and arms of the user, possibly causing injury thereto.

Accordingly, it is an object of this invention to provide a compact, lightweight, low-cost, hydraulically powered, high power, high-speed spindle and power system and methods for machining therewith, the apparatus being capable of withstanding relatively high side loads and being adaptable for utilizing a variety of newly-developed machine cutters of the hardest, most brittle materials. As an additional feature of the invention, the rotational speed of the spindle is selectable, with the selected speed being held constant irrespective of loading of the spindle.

As a further object of the invention, a method of machining is described featuring high feed rates, while generally confining heat generated by the machining process to the removed material.

SUMMARY OF THE INVENTION

A method for machining is disclosed wherein cutting edges of a cutting tool are oriented at a negative rake of from approximately 0° (neutral) to −10°, whereupon material is scraped from the workpiece. The tool is rotated at a speed of between approximately 15,000 rpm to approximately 30,000 rpm, after which the cutting edges are engaged with a workpiece. Thereafter, power applied to the cutting tool is varied so as to maintain constant rotational speed of the cutting tool while the cutting edges are engaged with the workpiece. During the machining process, vibrations are absorbed by a hydraulic cushion, allowing the tool to rotate without vibration, with heat generated by the machining process being confined mainly to the removed material.

BRIEF DESCRIPTION OF THE DRAWINGS

FIG. 3 is an end view of a surface cutter of the present invention.

FIGS. 3a and 3b are elevational and side views, respectively, of a first tool bit used with the cutter of FIG. 3.

FIGS. 3c and 3d are elevational and side views, respectively, of a second tool bit used with the cutter of FIG. 3.

FIG. 4 is an elevational view of the surface cutter shown in FIG. 3.

DESCRIPTION OF THE PREFERRED EMBODIMENT

Figure 1:
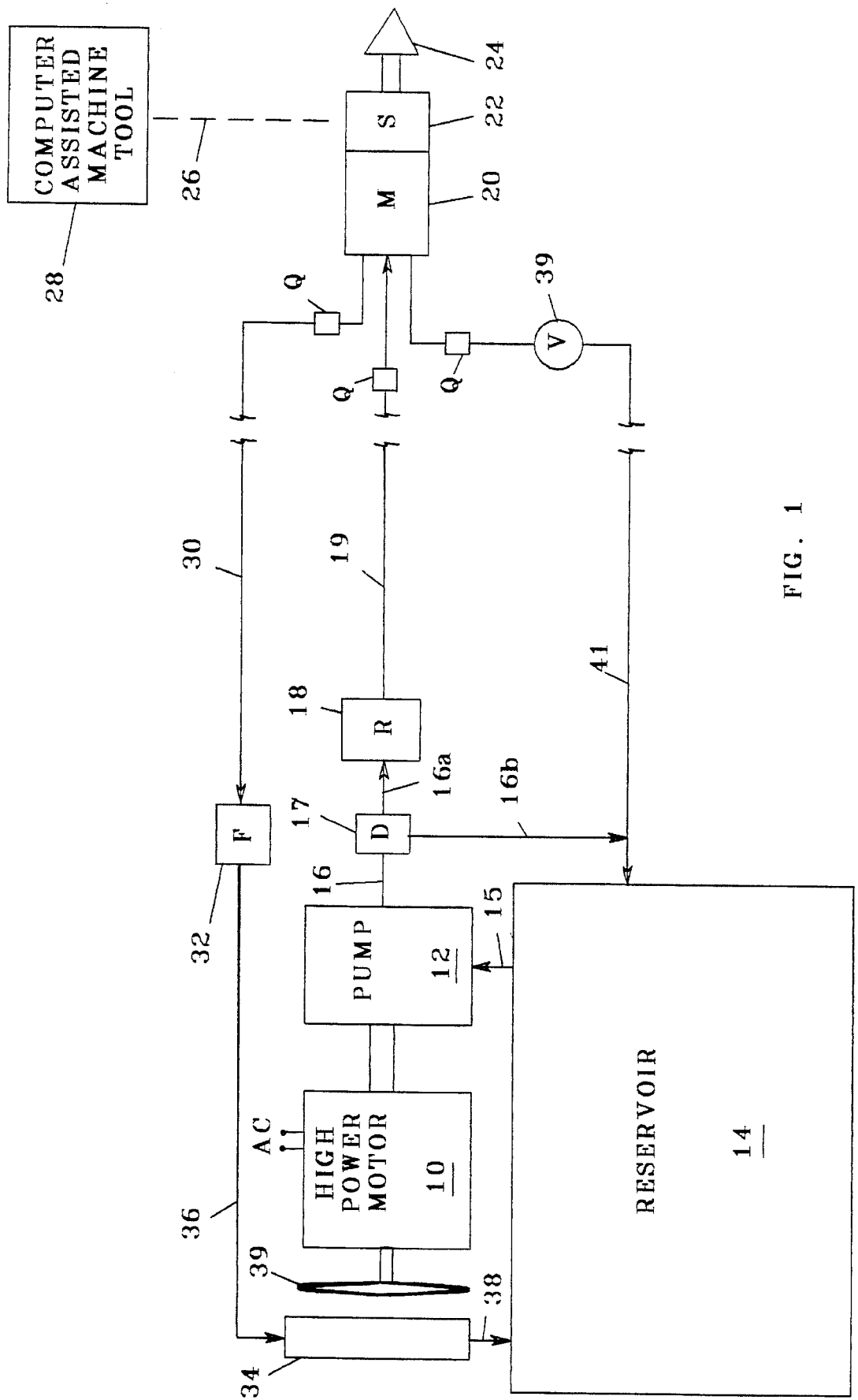
FIG. 1 is a schematic diagram of a system of the present invention.

Referring initially to FIG. 1, a schematic diagram of the present invention is shown. Here, a relatively large, standard, 230/460 volt, three phase, reversible, alternating current electric motor 10 on the order of about 20 horsepower or so is coupled to power a hydraulic gear pump 12, such as a pump of the V-5 series, obtainable from the Vickers Corporation located in Statesville, N.C., and which has a power rating matched to that of electrical motor 10. Pump 12 is also reversible and provides hydraulic fluid at a maximum flow rate of approximately 14.19 gallons per minute at a maximum pressure of approximately 3,000 psi. As shown in FIG. 1, the input shaft of pump 12 is coupled directly to the output shaft of motor 10, with motor 10 and pump 12 mounted atop a reservoir 14, which holds approximately 30 gallons of hydraulic fluid.

A suction line 15 carries hydraulic fluid from reservoir 14 to pump 12, and a high-pressure line 16 leads from pump 12 to a microswitch diverter 17, which is equipped with a pair of hydraulic fluid outlets, one being coupled via a high-pressure line 16a to an adjustable flow regulator 18, and the other outlet being coupled via a hydraulic line 16b back to reservoir 14. Diverter 17 functions as a safety device and is set so that if hydraulic pressure from pump 12 exceeds a set pressure, typically between 2,500 and 3,000 psi, the flow of hydraulic fluid is diverted back to reservoir 14 via hydraulic line 16b, removing hydraulic power from the tool.

Hydraulic line 16a from diverter 17 leads to adjustable flow regulator 18, such as flow regulator Part No. FD4 DTHS, obtainable from the Ruckers Corporation of Racine, Wis. As a feature of this invention, the flow rate of hydraulic fluid is manually set and held constant by regulator 18, allowing pressure of the hydraulic fluid to vary instantaneously and directly with load so that only the power needed to hold rpm of the cutting tool constant is applied to the workpiece, as will be further described. Regulator 18 in turn provides pressurized hydraulic fluid at the selected, constant, flow rate via a flexible, high-pressure line 19, which includes a quick disconnect coupling Q to a hydraulic spindle motor 20 such as one of the many applicable motors available from Oildyne Corporation of Minneapolis, Minn., and which is capable of developing the power from pump 12.

Figure 1A:
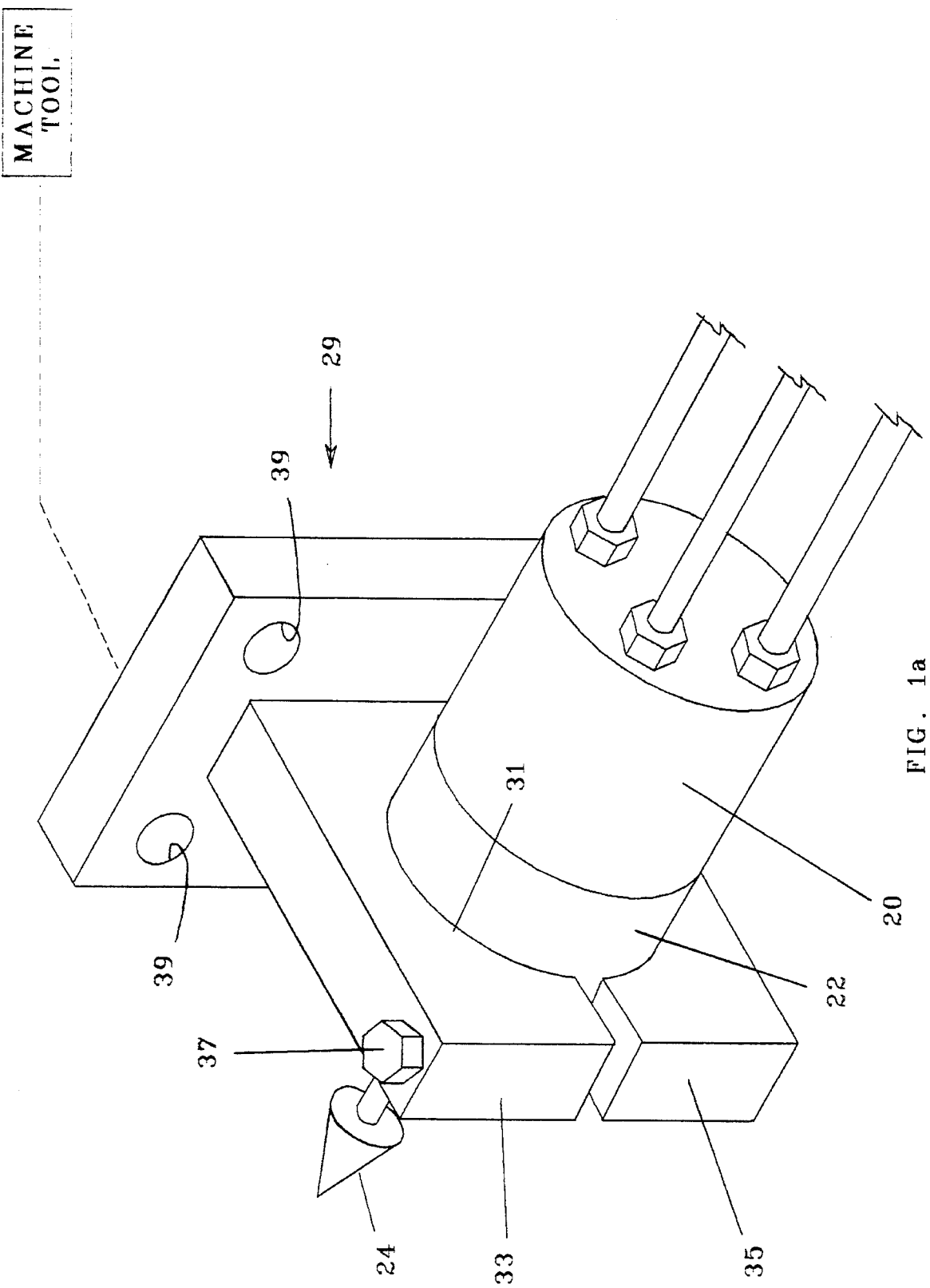
FIG. 1a is a pictorial illustration of a fixture adapted for mounting to a machine tool and for receiving a spindle of a motor and spindle assembly of the present invention.

Motor 20 (and other similar hydraulic motors) is remarkably small for the power it is capable of delivering, being on the order of approximately 2 inches in diameter, 3 inches in length, and weighing approximately a pound. Motor 20 is coupled to a spindle assembly 22 provided with a cutting tool 24, with the motor 20 and spindle assembly 22 mounted in a robotic manipulator or like member 26 (shown in dashed lines) of a machine tool 28, preferably of the type which is computer controlled. In this instance, the motor and spindle assembly, being of exceedingly small size and weight, are easily mounted in a fixture 29, such as that shown in FIG. 1a, which in turn is mounted to a machine tool, such as a computer controlled machine tool of a class that includes lathes, drill presses, etc. Fixture 29 is provided with a support plate having an opening 31 defined by split portions 33 and 35, with a pinch bolt 37 serving to clamp portions 33 and 35 against spindle 22. Openings 39 in a base plate serve to receive fasteners for affixing fixture 29 to an appropriate member 26 (shown in dashed lines) of machine tool 28.

A flexible, low-pressure return line 30 carries exhausted hydraulic fluid from motor 20 to a filter 32 coupled to a heat exchanger 34 by a line 36, which effects cooling of the hydraulic fluid prior to returning the fluid to reservoir 14 via line 38. A fan 39 coupled to motor 10 may be used to force air through heat exchanger 34, or a separate motor and fan (not shown) may be used for this purpose.

As a second, redundant, safety feature, a pressure relief valve 39 is coupled to motor 20 via a low-pressure line and quick disconnect coupling Q and is coupled to reservoir 14 by a low-pressure line 41. Valve 39 would be typically be set at the maximum pressure of 3,000 psi so that in the event of overloading of motor 20, destructive over pressurization of the system is avoided by relief valve 39 dumping hydraulic fluid back to reservoir 14.

Figure 2:
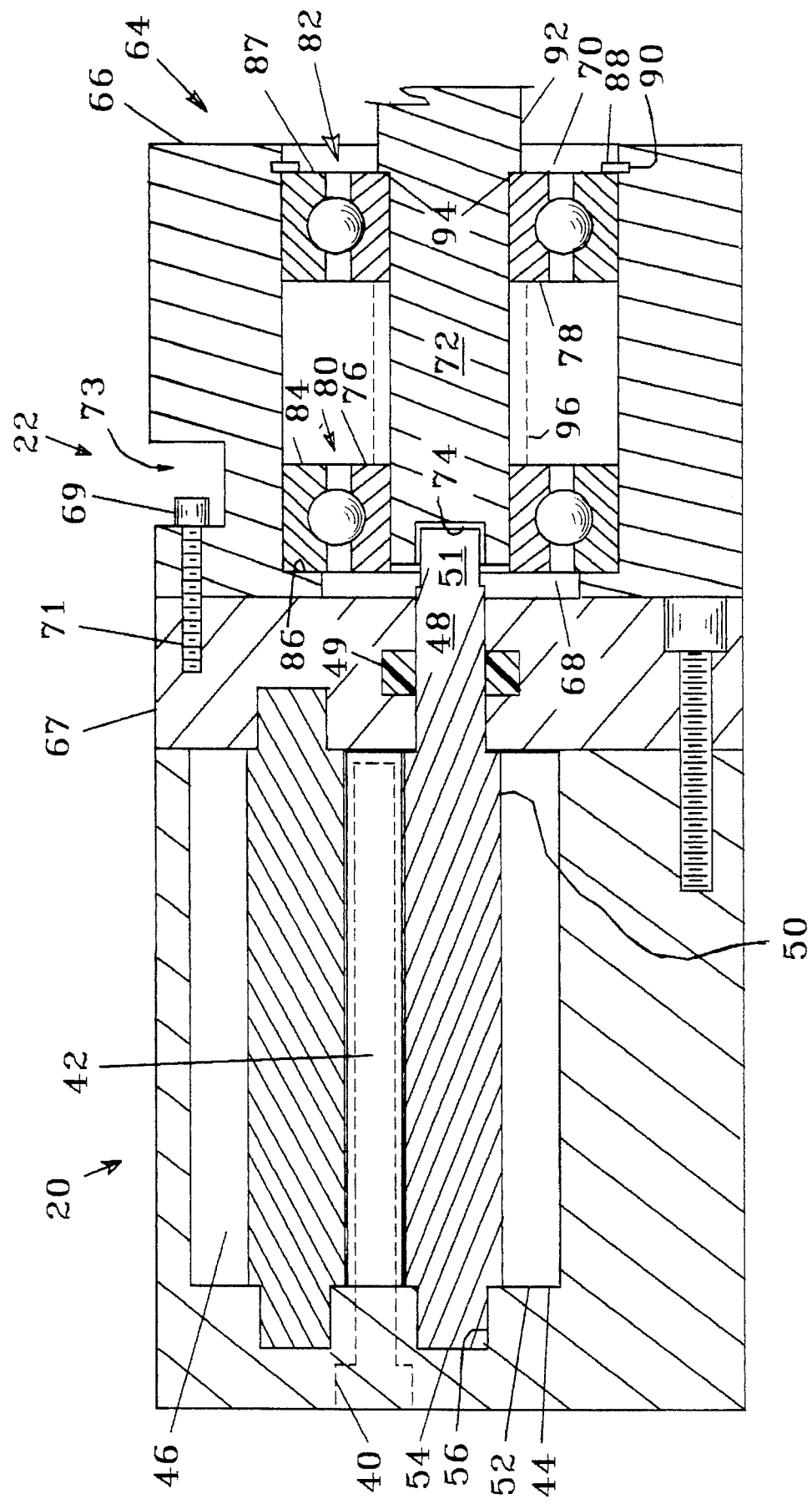
FIG. 2 is a cut-away view of a motor and spindle assembly of the present invention.

Hydraulic motor 20, as particularly illustrated in FIG. 2, is a low-cost hydraulic gear motor costing approximately $200. This is in sharp contrast with the cost of electrical servo motors and their control circuitry typically used in these applications which, as stated, can run into thousands of dollars and are generally too heavy and/or bulky to be fitted to machine tools such as robotic manipulators and computer-controlled movable members of CNC machine tools. Thus, in addition to the other features of the invention disclosed herein, the cost of the system as opposed to electrically-powered spindles is greatly reduced.

Motor 20 is constructed having a housing of aluminum, with side-by-side, communicating cylindrical recesses extending along the length of the housing, each rotatably containing an elongated gear which closely fits the respective recess to minimize leakage of hydraulic fluid around the gears. Hydraulic fluid under pressure enters to one side of the rear of the motor at an opening 40 and is forced at slot 42 (shown in dashed lines) through elongated gears 44 and 46, respectively. These gears are in closely meshed relation so as to reduce leakage of hydraulic fluid therethrough. As such, for a given volume of hydraulic fluid forced between gears 44 and 46, a set number of revolutions of the gears results. Gear 44 is affixed to an output shaft 48 at end 50 thereof, with a rectangular-in-cross-section key region 51 provided at the end of output shaft 48. Output shaft 48 may be supported by a bore through the end cap of motor 20, by a bushing, or may be supported by roller bearings of the type commonly known as "needle bearings" pressed into an opening of the cap (not shown). One or more seals 49 are provided in the end cap and around output shaft 48 to prevent leakage of hydraulic fluid from around the output shaft.

End 52 of gear 44 is provided with a stub shaft 54 rotatably supported in a blind bore 56 cut directly into the motor housing, by a bushing, or may be supported by needle bearings (not shown) pressed into an opening of the motor housing.

Gear 46 is an idler gear having a stub shaft at each end thereof, one of the stub shafts rotatably supporting gear 46 at one end in a blind bore cut directly into the aluminum material of the motor housing, with the other stub shaft rotatably supporting the gear at the other end in a blind bore cut into the motor cap. Gear 46 may alternately be supported by bushings or needle bearings as described for gear 44. The gears, stub shafts, and output shaft are all constructed of steel and ride on hydrostatic bearings provided by the hydraulic fluid circulating through the motor, which hydrostatic bearings also serve as a cushion to absorb sonic and harmonic vibrations.

Hydraulic fluid passing through the gears is exhausted from the motor via a second slot (not shown) positioned opposite slot 40 on the other side of gears 44 and 46, which oppositely positioned slot communicates with a second opening coupled to low-pressure return line 30. While this motor is capable of developing the power from pump 12, it is not constructed to withstand side (radial) or axial loads on the output shaft due to the steel shafts and ends of the gears being separated from the soft aluminum material of the motor housing and cap only by a thin hydrostatic bearing or by needle bearings not sufficiently durable to withstand such loads. As such, any significant side or axial loads applied to the output shaft overcome the hydrostatic bearings or cause damage to the needle bearings, ruining the motor.

In order to overcome this problem, and as a feature of this invention, a compact, heavy-duty spindle has been developed to absorb side (radial) loads incurred during operation where high feed rates on the order of 200 to 600 inches per minute are experienced. As shown in FIG. 2, spindle assembly 22, which is constructed of a harder metal than the aluminum housing of motor 20 so as to be clampable in opening 31 of fixture 29 (FIG. 1a), is illustrated as having a housing 66 of the same diameter as motor 20 (approximately 2 inches) and being of a length of approximately 2 inches. This motor and spindle assembly together form a package of only approximately 5 inches in length, and which is capable of developing constant rotational speeds of up to approximately 30,000 rpm with potential power of approximately 20 horsepower. As stated, this is the maximum potential horsepower of the hydraulic motor, as defined by electric motor 10 and pump 12 (FIG. 1), with actual power developed by motor 20 dependent on load. This relatively high level of power and high rotational speed is an important feature of the instant invention and facilitates transference of most of the heat generated by the machining process to the removed material. Additionally, these qualities further facilitate the high feed rates characterized by the instant invention and assist in preserving cutting edges of the composite tool bits disclosed herein.

Housing 66 defines openings 68 and 70 at each end thereof, with the keyed portion 51 of output shaft 48 of motor 20 extending through opening 68. A spindle 72 having a rectangular, mating keyway 74 for receiving keyed region 51 of output shaft 48 is rotatably supported in housing 66, as by a press fit with inner races 76 and 78, respectively, of precision ball bearings 80 and 82, such as bearings 9102PP, obtainable from Fafnir Corporation, of New Briton, Conn. Bearings 80 and 82 are constructed to very close tolerances, with virtually no axial movement or side movement thereof, and can withstand axial loads of 560 pounds and side loads of 1,400 pounds without significant wear or deflection. As such, the cutting tool 24 is held particularly stable during operation. The outer race 84 of bearing 80 is abutted, as by press fit, against a lip 86 adjacent to opening 68, while the outer race 87 of bearing 82 is located, as by press fit in opening 70, against a circular clip 88 fitted into a groove 90 in opening 70. A region 92 of enlarged diameter is machined on spindle 72, forming a wall 94 about spindle 72, with the inner race 78 of bearing 82 being pressed onto spindle 72 until race 78 abuts vertical wall 94. A spacer 96 (shown in dashed lines) may be positioned as shown to assist in locating bearings 80 and 82 during the pressing operations, or housing 64 may be constructed of shortened length (not shown) so that the respective inner and outer races of bearings 80 and 82 are pressed into abutting relation.

Spindle 72 extends through opening 70 of housing 66, and terminates, in one embodiment, with a surface cutting head 98 machined integral with spindle 72. With this construction, and unlike the prior art device, there are no threaded or other connections between the spindle and the cutting head that would otherwise tend to introduce imbalance of the cutting head that in turn would produce unacceptable vibration of the tool. Further, the spindle and integral cutting head may be further subjected to dynamic precision balancing procedures in order to perfectly and permanently balance spindle 72 and head 98.

Where reaming or drilling type operations are required, a centering chuck (not shown) may be installed at the end of spindle 72 to receive drilling type tool bits. Here, the end of spindle 72 may be provided with precision machined keyways (not shown) longitudinally positioned on output shaft 72, as is known to those skilled in the art, for receiving the chuck. While precise balancing of a centering chuck is not as critical as the wider tooling required for surface cutting operations, it may be desirable to balance the spindle and chuck assembly after the chuck is installed due to the high rotational speed of the tool.

Housing 66 may be coupled to end 67 of motor 20 by means of screws or bolts 69 positioned in openings 71 in cutout regions 73 of housing 66, as shown in FIG. 2 (only 1 cut-out being shown), with each screw or bolt 69 engaging a threaded opening in end 67 of motor 20. Thus, with a separate spindle assembly having its own particular cutting or machining head integral with the spindle, it is a relatively easy task to simply change the spindle assembly each time a different machining operation is required or to simply change the motor and spindle assembly as a unit, the hydraulic lines being quickly connected and disconnected by quick-disconnect couplings Q (FIG. 1) located proximate motor 20, as are well known by those skilled in the art.

Surface cutting head 98, as particularly shown in FIGS. 3 and 4, and as one example of a cutting tool of the present invention, is constructed having three outwardly extending arms 100, 102, and 104 extending radially outward from a center point 106 of head 98, with each arm provided with a recess 108 for receiving a closely-fitting, diamond-shaped tool bit 110. A rearward wall 111 is formed in each of recesses 108, each wall 111 having a threaded opening 113 (shown in dashed lines) therein.

Each tool bit 110 is provided with edges 112 (FIGS. 3a and 3b) at the apex of opposed ends of each bit, with each edge 112 extending beyond the end of head 98 when the bits are installed in their respective recesses 108. Edges 112 are defined by a forwardly facing, slightly recessed wall or surface 112a and edges thereof leading to edge 112, and an edge 130 angled approximately 11 degrees with respect to surface 112a terminating at edge 112 in a slight radius of approximately 0.010 to 0.020 inch.

For affixing each tool bit in its respective recess, a centrally located opening 115 (FIG. 3b) in each bit is provided and through which a fastener, such as a machine screw 117 (FIG. 3), is inserted and threadably engaged with one of openings 113 in arms 100, 102, 104. With this construction, it is seen that the bits are fully supported in each respective recess, with cutting forces imparted to cutting edges 112 transferred directly to head 98 by bit surfaces 124 and recess surfaces 111 (FIG. 3).

Further, in a preferred embodiment of geometry of tools of the present invention, each of recess surfaces 111 may be inclined from approximately 0° to 10° away from the direction of rotation, as shown in FIG. 4, giving cutting edge 112 a negative rake. As such, the cutting action of the present invention is characterized by high rotational speed of head 98 (15,000 to 30,000 rpm) in conjunction with a scraping or shearing action of the cutting edges that is believed to fracture and shatter material to be removed from the workpiece, reducing heat generated by the cutting process. This action apparently arises in part from the characteristics of the materials contemplated to be machined by the method and apparatus of the present invention which, as stated, are newly developed composites and metallic alloys designed for aerospace and aeronautical applications and which possess particular abrasiveness and hardness, respectively, that defies conventional machining techniques. This is highly advantageous inasmuch as heat and its deleterious effects on the machined article are greatly reduced, while permitting high feed rates of the workpiece.

Alternately, as shown in FIGS. 3c and 3d, cutting bits each having a radiused cutting edge 134 are believed to provide better machining at high feed rates by providing increased surface area of the cutting bits and more graduated advancement of the cutting edges 134 into the workpiece in combination with the high rotational speed of the spindle.

For machining composite materials, the tool bits, as recently developed by Greenleaf Corporation of Saegartown, Pa., are preferably constructed of, but not limited to, ceramic materials containing or having cutting edges coated, as by vapor deposition, with a material or materials of the class having a hardness generally above Rockwell C 90, such as cubic boron nitride, silicon nitride, diamond, or other materials of this class, and which are deposited on substrates, such as ceramic, by the Norton Corporation, of Wister, Mass. Feed rates of a workpiece constructed of a composite material, when using these ceramic bits during surface cutting and routing operations, may be as high as 600 inches per minute at a spindle speed of 30,000 rpm. At this high rotational speed, the cutting edges of a rotating tool such as surface cutter 98, which has three cutting edges, remove up to 0.066 inch of composite material per pass, or 0.02 inch of material per revolution of the tool, without delamination, chipping, significant heat buildup, or significant wear of the tool bits. As increasing depth of the cut increases hydraulic pressure applied to motor 20, as does increasing feed rates, depth of the cut taken by head 98, in conjunction with the feed rate, is adjusted so that the hydraulic pressure applied to motor 20 does not exceed the trip limits of diverter 17 or relief valve 39 (FIG. 1) and may be as high as 0.01 inch or greater.

Where hardened alloyed metals such as Inconel 718, NASA-23, KBK-75, 18-8 stainless steel, aluminum lithium alloys, 22-19 aluminum, Incaloy 903, titanium alloys, 9-4-30 steel, etc., are to be cut or machined, the tool bits may be constructed as described above of the ceramic materials and may further include an alumina ceramic material containing tungsten fibers, which material and tool bits also have been recently developed by the Greenleaf Corporation. Where a harder base metal may be required, carbide or other hardened metallic alloys may be used to construct the cutting bits, with the cutting edges coated with one or more of the materials having a hardness above Rockwell C 90 as described above. Of course, conventional carbide bits may also be used, but they require more frequent maintenance due to more rapid dulling of cutting edges thereof. Feed rates of components constructed of these metallic alloys, as with composites, is adjusted in conjunction with the depth of the cut in order to keep hydraulic pressure below the trip limit, or upper hydraulic pressure limit, of diverter 17 and relief valve 39, and may be as high as 400 inches per minute with a spindle speed of 30,000 rpm, meaning that 0.013 inch of metal per revolution is removed by the above-mentioned surface cutter, or 0.0044 inch per cutting edge per revolution. Of course, with softer materials, the depth of cut may be greater, up to approximately 0.010 inch, while with harder materials, the depth of cut must be correspondingly reduced. This is accomplished without any significant heat buildup of the workpiece or the tool bits, the heat generated by the cutting process being transferred almost exclusively to the particles removed from the workpiece, as will be further explained.

In use, the source of hydraulic fluid is prepared for operation, with microswitch diverter 17 set to divert hydraulic flow from motor 20 to reservoir 14 at a pressure generally between 2,500 and 3,000 psi. A spindle assembly having a hydraulic motor attached thereto is clamped in opening 31 of a fixture 29, in turn connected to a computerized machine tool as described. Electrical power is applied to motor 10, causing pump 12 and regulator 18 to provide a constant flow of hydraulic fluid to hydraulic motor 20. As stated, pressure of the hydraulic fluid provided to motor 20 varies directly with load, with flow, and thus rpm of the cutting head, being held constant. If, for whatever reason, pressure of hydraulic fluid from pump 12 exceeds the trip pressure of diverter 17 or relief valve 39, the flow of hydraulic fluid is dumped back to reservoir 14. Thus, if a selected feed rate is exceeded or proves too great, or the tool becomes blocked by accident, power applied to the cutting head is removed, preventing damage to the tool and possibly to the workpiece.

Figure 5:
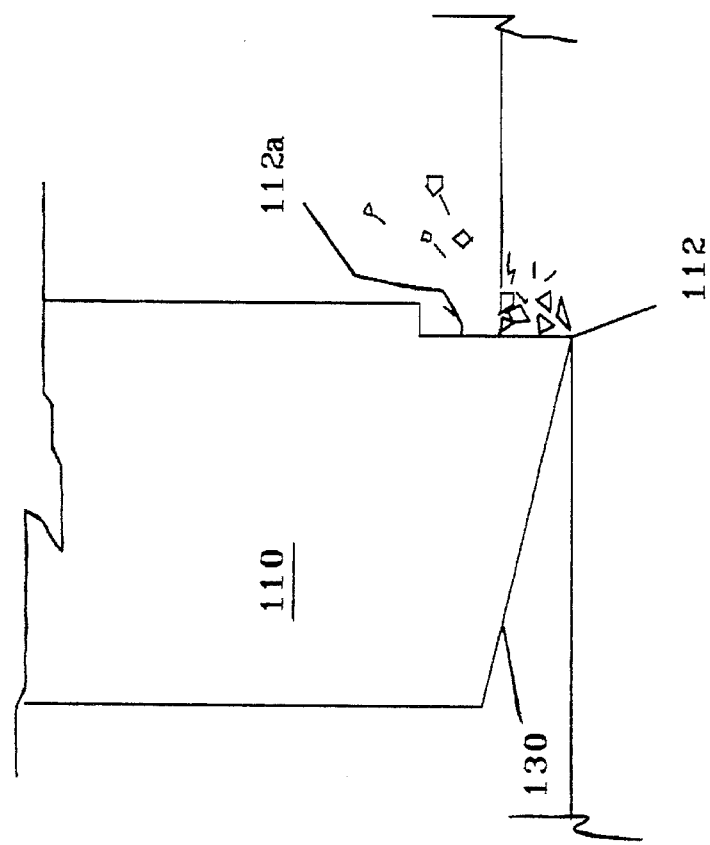
FIGS. 5 and 6 are enlarged, cut-away, side views illustrative of the operation of the present invention.
Figure 6:
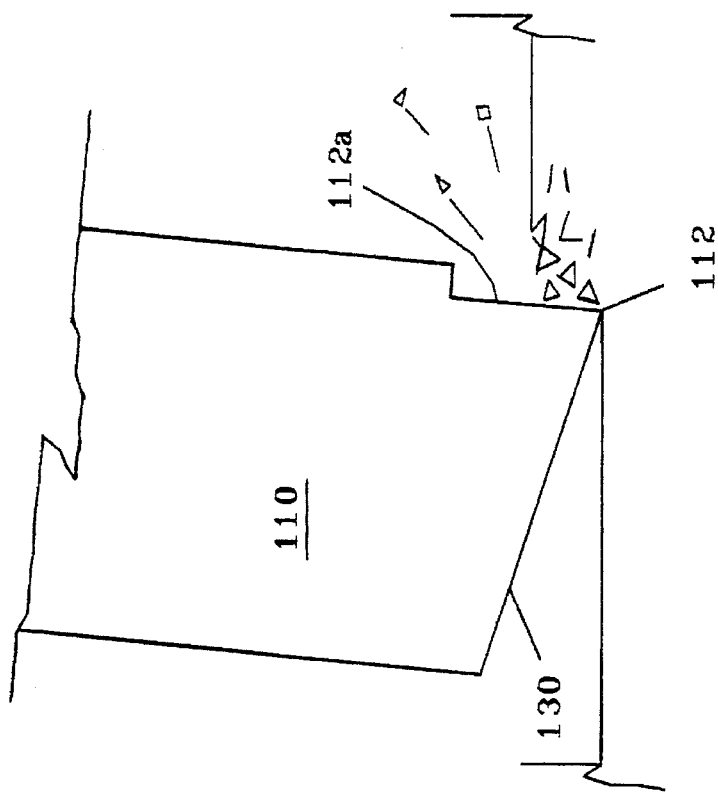

As the spindle and cutting head are rotated, either the workpiece or the motor and spindle assembly is moved so that the cutting bits engage the workpiece with a feed rate of up to 600 inches per minute. While side loads applied to the spindle may be relatively high, little axial force is needed to maintain the depth of cut due to high rotational speed of the spindle, which may be varied by flow control 18 from approximately 15,000 rpm to approximately 30,000 rpm. As shown in FIGS. 5 and 6, the 0° to 10° angle of surface 113 of bits 110, in conjunction with the high rotational speed of head 98, scrapes material from the workpiece with a chipping and shearing action which fractures material just ahead of surface 113. As such, there are no downward forces on bits 110 caused by a digging action that would cause the bits to hang or chatter or otherwise become damaged due to digging or cutting material from the workpiece. Further, the negative angle of the tool bits causes cutting edges thereof to have an inordinately long lifespan because the cutting edges are not conventionally used for cutting. Rather, surfaces 112a shear material from the workpiece, while cutting edges 112 scrape the sheared surface smooth. Additionally, the shearing action of the instant invention generates far less heat due to less friction, with what heat that is generated being localized in the removed material. This eliminates the need for a coolant, with no significant heat buildup in the workpiece.

As cutting proceeds, the forward edges of tool 98, which are advancing into the workpiece, remove the bulk of material by the described shearing action, while the trailing edges 112 scrape the cut regions smooth. Any vibrations are absorbed and greatly reduced by the hydraulic cushion provided by the pressurized hydraulic fluid between the moving and stationary parts of the hydraulic motor, which vibrations otherwise contribute to chipping and wear of the cutting bits. After the cut is completed, a different spindle assembly for performing a different machining operation may be clamped in fixture 29, and the other operation initiated. The geometry of cutting edges or surfaces of these other tools would be generally as described, i.e., being angled so as to remove material from the workpiece with a shearing action so as to generate less heat, which heat would be localized in the removed material.

Having described my invention and the manner of its use, it is apparent that incidental modifications may be made thereto that fairly fall within the scope of the following appended claims, wherein.

I claim:

1. A method for reducing heat and vibration during a machining process comprising the steps of:

orienting cutting edges of a cutting tool at an angle between a neutral angle and a negative angle of approximately 10°, causing a shearing action that removes material from a workpiece;

rotating said cutting tool at a selected speed between approximately 15,000 rpm and approximately 30,000 rpm;

engaging said cutting edges with a workpiece;

varying power applied to said cutting tool directly with load so that said selected speed is held constant while said cutting edges are engaged with said workpiece; and cushioning said cutting edges with a hydraulic cushion, absorbing vibrations of the machining operation, whereby the cutting tool is rotated at high speed essentially free of vibration, and heat from the machining process is imparted mainly to the removed material.

2. A method as set forth in claim 1 further comprising the step of constructing said cutting edges of a ceramic material.

3. A method as set forth in claim 2 further comprising the step of coating said cutting edges with at least one material having a hardness greater than Rockwell 90 C.

4. A method for machine cutting a workpiece comprising the steps of:

(1) providing a source of hydraulic fluid at a constant flow rate and at a pressure that varies directly with load, said pressure having an upper pressure limit;

(2) providing said constant flow rate of hydraulic fluid to a hydraulic motor having an output shaft, said motor having a characteristic that a given volume of hydraulic fluid passing through said motor produces a given number of revolutions of said output shaft;

(3) directly coupling said output shaft of said motor to one end of a spindle rotatably supported in a housing and rigidly mounting said motor to said housing, said spindle and housing forming a spindle assembly resistant to radial and axial loads applied to said output shaft;

(4) providing a machining tool to an opposite end of said spindle, said machining tool having a plurality of edges for removing material from said workpiece; and (5) mounting said spindle assembly with said motor mounted thereto to a machine tool in movable, accurately controllable relation with said workpiece so that said edges accurately engage said workpiece, with said pressure being maintained below said upper limit.

5. A method as set forth in claim 4 further including the step of supporting said spindle by at least two sets of ball bearings.

6. A method as set forth in claim 4 further comprising the step of mounting said spindle assembly and said motor to a computer controlled machine.

7. A method as set forth in claim 4 including the step of selecting said flow rate of hydraulic fluid to produce a constant rotational speed of said motor, said spindle, and said tool between approximately 15,000 rpm to approximately 30,000 rpm.

8. A method as set forth in claim 4 further comprising the step of orienting said edges of said machine tool at neutral to negative angles so as to scrape material from said workpiece.

9. A method as set forth in claim 8 further including the step of constructing said edges of a ceramic material.

10. A method as set forth in claim 9 further including the step of coating said edges with one or more materials of the class of materials having a hardness in excess of Rockwell C 90.

11. A method as set forth in claim 8 further including the step of engaging said machine tool in said workpiece at feed rates of from 75 to 600 inches per minute.

12. A method as set forth in claim 8 comprising the step of machining a said workpiece constructed of a composite material.

13. A method as set forth in claim 8 comprising the step of machining a said workpiece constructed of a hardened, alloyed metallic material.

14. A hydrodynamic system for high-speed machining of materials used particularly in aeronautical and aerospace applications and comprising:

a source of pressurized hydraulic fluid further comprising:
an electrical motor,
a reservoir of hydraulic fluid,
a hydraulic pump powered by said electrical motor and adapted to provide said hydraulic fluid under pressure,
an adjustable flow control coupled to said hydraulic pump and selectively providing a constant flow of pressurized said hydraulic fluid, a hydraulic motor having an output shaft rotated at a selected constant rate by said constant flow of pressurized hydraulic fluid at a speed of between 15,000 rpm and 30,000 rpm, and wherein pressure of said hydraulic fluid varies directly with load, said hydraulic fluid providing a hydraulic cushion to absorb vibration, and a spindle assembly comprising:
a housing coupled to said hydraulic motor,
a spindle rotatably supported in said housing and resistant to radial or axial loads and coupled at one end to said output shaft of said hydraulic motor, and
a machining tool including edges for removing material from a workpiece and provided on an opposite end of said spindle,
whereby said machining tool is rotated at a constant rate and essentially free of vibration during a machining operation.

15. A system as set forth in claim 14 further comprising a hydraulic flow diverter that diverts flow of hydraulic fluid from said motor to said reservoir at a selected upper limit of hydraulic pressure.

16. A system as set forth in claim 14 wherein said machine tool is of unitary construction with said spindle.

17. A system as set forth in claim 14 wherein said edges of said machining tool are mounted at a selected angle between a neutral angle and a negative angle of approximately 10° so as to shear said material from said workpiece.

18. A system as set forth in claim 17 wherein said edges are constructed of a ceramic material.

19. A system as set forth in claim 17 wherein said edges are coated with one or more materials of the class of materials having a hardness greater than Rockwell C 90.

20. A system as set forth in claim 17 wherein feed and depth of cut of said machining tool are adjusted so as to maintain said pressure of said hydraulic fluid below a pressure of a selected upper limit.

* * * * *